No. 772,609. PATENTED OCT. 18, 1904.
M. G. DE HART.
TIRE.
APPLICATION FILED MAR. 2, 1904.
NO MODEL.

Witnesses
Chas. L. Clagett
Chas. J. Wolf

Inventor
Marie G. DeHart
By her Attorney
Wm. Stockbridge

No. 772,609.

Patented October 18, 1904.

UNITED STATES PATENT OFFICE.

MARIE G. DE HART, OF CINCINNATI, OHIO, ASSIGNOR OF ONE-HALF TO JENNIE L. GREGORY, OF WASHINGTON, DISTRICT OF COLUMBIA.

TIRE.

SPECIFICATION forming part of Letters Patent No. 772,609, dated October 18, 1904.

Application filed March 2, 1904. Serial No. 196,134. (No model.)

*To all whom it may concern:*

Be it known that I, MARIE G. DE HART, a citizen of the United States, residing at Cincinnati, Ohio, have invented certain new and useful Improvements in Tires, of which the following is a specification.

My invention resides in an improved elastic or cushion tire for the wheels of vehicles.

The same consists of a cushion-support for a hollow tire comprising a band and a chain or succession of imperforate spring-loops secured to said band.

It also consists of an outer yielding protecting-casing, a resilient lining for said casing consisting of braided or woven metallic ribbons or wire, and a continuous imperforate supporting-spring bent to form a succession of oppositely-disposed loops.

The details of the invention will hereinafter appear and the novel features thereof be set forth in the claims.

Figure 1:
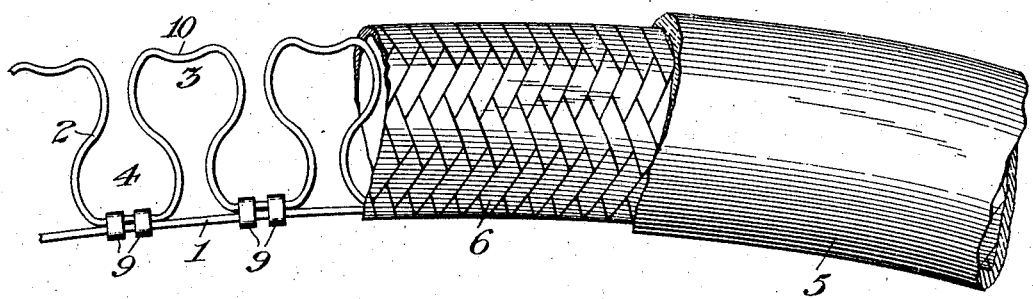
Figure 2:
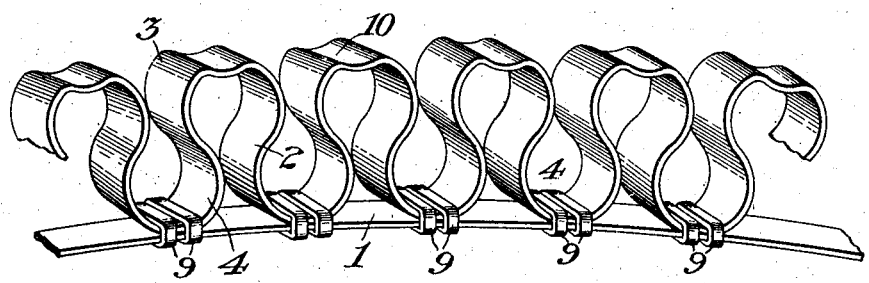
Figure 3:
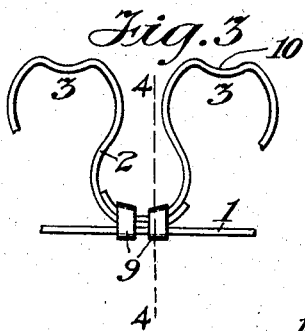
Figure 4:
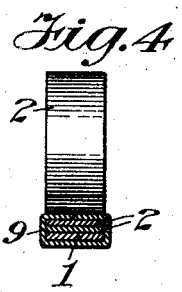
Figure 5:
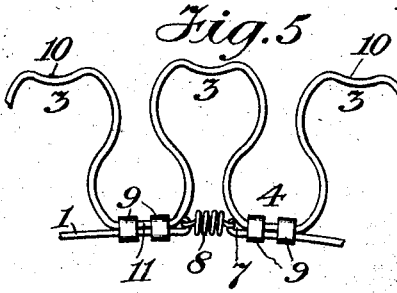

In the drawings forming part of this specification, Figure 1 is an elevation of my improved tire with the outer casing broken away to show the braided or woven lining and the latter broken away to show the supporting and cushioning spring. Fig. 2 is a perspective view of the cushioning-spring and the retaining-band, to which it is connected. Fig. 3 is a detail view showing the meeting ends of the cushioning-spring. Fig. 4 is a section on the line 4 4 of Fig. 3, and Fig. 5 is a detail view showing one means for connecting the ends of the retaining-band.

Like reference-numerals indicate like parts in the different views.

In the embodiment of my invention herein shown the improved tire consists of the retaining-band 1, a supporting and cushioning spring 2 secured thereto and made up of a succession or chain of imperforate spring-loops 3 4, a yielding protecting-casing 5, and a resilient lining 6 of braided or woven metallic ribbon or wire. The ends of the band 1 are preferably formed with hooks 7 for the attachment of a spring-link 8, so that a tire when in place will be held to the rim of the wheel under a slightly-yielding tension.

The band 1 is preferably made of a flat strip of sheet metal bent to fit the rim of the wheel for which the tire is intended, and the spring 2 is connected thereto by the clips 9, which encircle or embrace the loops 4 of said spring and the band 1. The use of these clips avoids the necessity of puncturing and thereby weakening the spring 3, which would be necessary if rivets, screws, or other like securing devices were employed.

The loops 3 and 4 of the spring 2 are oppositely disposed and all lie in the same plane. Said loops are formed by bending the strip from which the spring is made back and forth upon itself. The outer surfaces of the loops 3 are outwardly curved or arched, so as to conform to the curvature of the inner surface of the lining 6, and said loops are also formed with the laterally-extending indentations 10. Similar indentations 11 are formed on the inner surfaces of the loops 4. These indentations serve to distribute the strain of the load which the tire has to bear and render the same more resilient without detracting from its strength. Said indentations may be dispensed with, however, if desired, and I may also substitute for the clips 9 other means of securing the spring 2 to the retaining-band 1.

The outer protecting-casing 5 of the tire may be made of canvas, rubber and canvas, or other suitable material. It is tubular in form and serves to inclose the remaining portions of the tire. The resilient lining 6 is, as stated, made of braided or woven spring-wire or ribbon. The method of manufacture may be similar to that described in United States Patent No. 588,823, granted to William B. Gregory August 24, 1897. The ends of each strand of the ribbon or wire, however, are cut off evenly at each end of the tubular lining and welded together. The two ends of the tubular lining are then brought together without overlapping and surrounded by a narrow band, which is itself welded or otherwise secured thereto. In this way bulging of the tire at the junction of the two ends of the braided or woven metallic lining is avoided.

In order to prevent the clicking noise or rattle incident to contact between the loops 3 and the tubular lining 6, I propose to coat or cover said loops with rubber or other non-resonant substance.

Having now described my invention, what I claim as new, and desire to secure by Letters Patent, is—

1. A tire comprising an outer yielding casing, a retaining-band for holding the tire to a wheel-rim, and a chain of longitudinally-extending imperforate spring-loops lying in a single plane within the casing.

2. A tire comprising an outer yielding protecting-casing, a resilient braided or woven lining for said casing, a retaining-band for holding the tire to a wheel-rim, and a succession of imperforate spring-loops attached to the band.

3. A tire comprising an outer yielding inclosing casing, a resilient tubular lining for said casing consisting of braided or woven strips, a spring consisting of a band bent to form a succession of opposing loops, and a retaining-band, the said band and the said spring being secured together by clips.

4. A tire comprising an outer yielding casing, a retaining-band for holding the tire to a wheel-rim, and a chain of longitudinally-extending imperforate spring-loops lying in a single plane within the casing and having transversely-extending depressions at the arches thereof.

5. A tire comprising an outer yielding protecting-casing, a resilient braided or woven lining for said casing, a retaining-band for holding the tire to a wheel-rim, and a succession of imperforate spring-loops attached to the band and having transversely-extending depressions at the arches thereof.

In testimony whereof I have hereunto set my hand in presence of two subscribing witnesses.

MARIE G. DE HART.

Witnesses:
SAMUEL SALZER,
SAUL FIELONKY.